United States Patent [19]

Katunuma

[11] 3,928,568

[45] Dec. 23, 1975

[54] AMPLIFYING FACTOR OF CORTISONE INDUCTION AND PROCESS OF THE PRODUCTION THEREOF

[75] Inventor: Nobuhiko Katunuma, Tokushima, Japan

[73] Assignee: Chugai Seiyaku Kabushiki Kaisha, Tokyo, Japan

[22] Filed: Sept. 24, 1973

[21] Appl. No.: 399,795

Related U.S. Application Data

[63] Continuation of Ser. No. 180,756, Sept. 15, 1971, abandoned.

[30] Foreign Application Priority Data

Sept. 19, 1970 Japan.............................. 45-81821

[52] U.S. Cl. .................. 424/115; 195/80; 424/116
[51] Int. Cl............................................ A61k 21/00
[58] Field of Search.................... 424/115, 116, 117; 195/80 R

[56] References Cited
UNITED STATES PATENTS

| | | | |
|---|---|---|---|
| 3,183,156 | 5/1965 | Vavra et al. ........................ | 424/116 |
| 3,536,811 | 10/1970 | Ottens et al. ....................... | 424/116 |

*Primary Examiner*—Jerome D. Goldberg
*Attorney, Agent, or Firm*—Browdy and Neimark

[57] ABSTRACT

An amplifying factor of cortisone induction (AFCI), which may be used in stead of or in combination with cortisone and which is effective as a hypotensive agent is disclosed. The AFCI can be produced intracellularly and extracellularly by cultivating a microorganism of Family Enterobacteriaceae in an aqueous nutrient medium.

8 Claims, 12 Drawing Figures

⊘ NINHYDRIN POSITIVE
○ FLUORESCENCE

AMPLIFYING FACTOR OF CORTISONE INDUCTION AND PROCESS OF THE PRODUCTION THEREOF

This is a continuation of application Ser. No. 180,756, filed Sept. 15, 1971, now abandoned in favor of the present application.

This invention relates to a substance having enzyme induction and hypotensive properties and a process for the production of said substance.

As a result of comparative studies as to the enzyme induction abilities of conventional animals and germ-free animals, the present inventor found that the enzyme induction ability of a germ-free animal is lower than that of the comparable conventional animal. A further study of the mechanism involved results in the discovery that, when a microorganism isolated from the feces of a conventional albino rat is cultivated, there is accumulated, both intracellularly and extracellularly, a novel peptide which will amplify the induction of tyrosine transaminase and will also influence other enzyme inductions by cortisone.

This finding was followed by further research, which has led to the discovery that the above novel substance (which is hereinafter referred to as AFCI or amplifying factor of cortisone induction) has not only an enzyme induction ability but also an excellent hypotensive property and that AFCI is specifically produced by bacteria which belong to the Family Enterobacteriaceae.

By the term "cortisone induction" used throughout the specification and claims of this invention is meant an enzyme induction by cortisone.

The object of this invention is to provide a novel amplifying factor of cortisone induction which is a peptide. Another object of this invention is to provide a process for the production of a novel amplifying factor of cortisone induction by cultivating an organism of Family Enterobacteriaceae.

A further object of this invention is to provide purified amplifying factors A and N of cortisone induction and a process for the production thereof.

A still further object of this invention is to provide a novel peptide which exhibits a hypotensive activity.

These and other objects of this invention will be apparent from the disclosure given hereinafter by those skilled in the art.

In the attached figures,

FIG. 9 (9-a, 9-b and 9-c) is a graph showing a hypotensive activity of AFCI-N and AFCI-A and purified AFCI-A.

Most of the microorganisms of Enterobacteriaceae useful in the present invention are known to those skilled in the art. The present invention is contemplated to include the use of any microorganisms of Enterobacteriaceae having an ability to produce an amplifying factor of cortisone induction. Representatives of these microorganisms are set forth below. These microorganisms have been deposited with the Institute of Applied Microbiology, Tokyo University, No. 1-1, 1-chome, Yayoi, Bunkyo-ku, Tokyo, Japan and the American Type Culture Collection, 12301 Parklawn Drive, Rockville, Md. 20852, U.S.A.

In accordance with this invention, AFCI is produced by the process comprising cultivating an AFCI-producing organism of Enterobacteriaceae in an aqueous nutrient medium containing a source of carbon, nitrogen and inorganic salts and recovering AFCI from the resulting culture broth. More particularly, AFCI is produced by the steps of cultivating an AFCI-producing organism of Enterobacteriaceae in an aqueous nutrient medium containing a source of carbon, nitrogen and inorganic salts, extracting the propagated cells with water or a salt solution to obtain an aqueous bacterial extract, deproteinizing said extract, causing the extract to be adsorbed on activated carbon under weakly acidic conditions, eluting the adsorbate with an alkali-acetone mixture, neutralizing and thereafter concentrating the eluate, subjecting the concentrate to a column chromatography on dextran gel and collecting fractions having a tyrosine transaminase inducing activity. The bacteria of the Family Enterobacteriaceae which are employed according to this invention are those microorganisms belonging to the genera of Escherichia, Aerobacter, Klebsiella, Paracolobactrum, Alginobacter, Erwinia, Serratia, Salmonella, Proteus and Shigella. Examples of the species include *Escherichia coli, Erwinia aroideae, Erwinia carotovora, Serratia marcescens, Proteus mirabilis, Proteus vulgaris, Proteus morganii, Aerobacter aerogenes* and the like.

Those microorganisms are cultivated under the conditions which are routinely employed for the cultivation of the common species of bacteria.

The separation and recovery of AFCI from the culture broth is carried out in the following manner. In the first place, the culture broth is centrifuged or filtered to obtain the cells which are then suspended in water or a salt solution, e.g. physiological saline solution, and the suspension are subjected to an appropriate treatment such as sonic destruction whereby a bacterial substance is extracted. This extract is preferably pooled with the filtrate or the supernatant previously obtained by filtration or centrifugation, followed by deproteinization with the addition of, e.g. perchloric acid and trichloroacetic acid and centrifugation. The supernatant is then rendered weakly acidic preferably pH 3–7, and activated carbon is added to this acidic liquid so that AFCI contained in the liquid is caused to adsorb on the carbon.

To this AFCI-carbon is added an alkali-acetone mixture, preferably a 0.2N potassium hydroxide-acetone mixture (1:1 by volume), to elute AFCI from the carbon. The eluate is then neutralized and concentrated. The concentrate is column-chromatographed on dextran gel and fractions having a tyrosine transaminase inducing activity are collected.

To collect the active fraction, each fraction eluting from the dextran gel column is intraperitoneally administered to normal male albino rats (Wister-Imamichi strain) and the animals are sacrificed after an elapse of 5 hours. The liver tyrosine transaminase activity is measured according to the procedure of Experiment I as described below. The active fractions having the inducing activity of tyrosine transaminase are pooled.

The AFCI of the present invention has an amplifying activity of the enzyme induction by cortisone, especially of tyrosine transaminase induction and may be used in stead of or in combination with cortisone to decrease the amount of cortisone to be used, which has various side effects in spite of beneficial pharmaceutical effects.

The AFCI of the present invention has also hypotensive activity.

The AFCI may be used, either in the AFCI solution obtained as above as it is or in a suitable concentrated solution. The dosage is, in an animal test using albino rat, preferably 0.2 – 2.0 of $OD_{260}$/ml/100 g body weight by oral or intraveneous administration.

The AFCI solution obtained as above may be lyophilized for storage.

Figure 1:
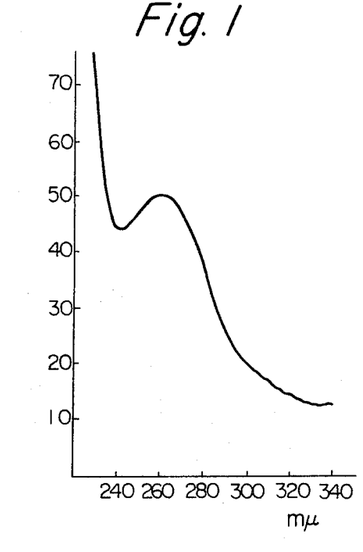
FIG. 1 is ultraviolet absorption spectrum in water of amplifying factor of cortisone induction (AFCI) of this invention.
Figure 2:
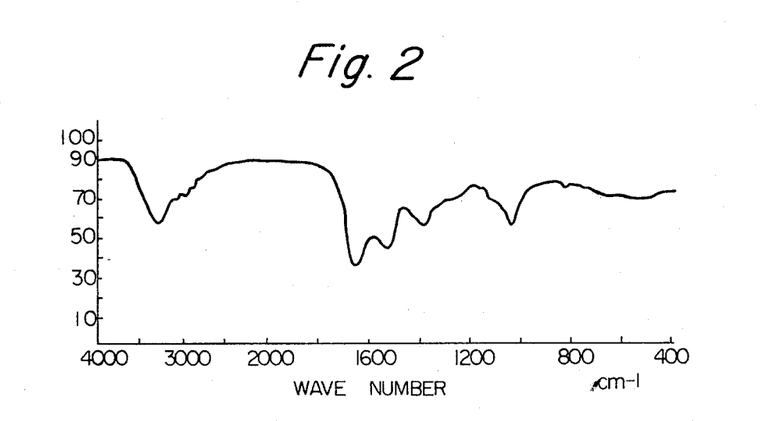
FIG. 2 is infrared absorption spectrum of AFCI by KBr disc method.

The AFCI which is obtained in the above manner may be further purified by various known techniques such as chromatography utilizing an ion exchange resin, paper chromatography, thin layer chromatography and the like, as used alone or in a suitable combination. The thus obtained AFCI has the following properties:

a. It is a slightly yellowish and highly hygroscopic powder.
b. It is easily soluble in water to give a yellow clear solution, and gives positive ninhydrin, Folin-Ciocalteu and cystein-sulfuric acid reactions.
c. It shows ultraviolet and infrared absorption spectra as shown in FIG. 1 and FIG. 2, respectively, where it exhibits characteristic absorption in the ultraviolet region at 263 m$\mu$ in water and in the infrared region at 3,300, 1,650, 1,530, 1,390, 1,040 and 830 cm$^{-1}$ by KBr disc method.
d. It does not lend itself to elementary analysis since it undergoes decomposition in two stages, making it difficult to determine the elemental composition of AFCI.
e. Its molecular weight is presumed to lie somewhere between the molecular weight of vitamin $B_{12}$ (1357) and that of cytochrome C (13000), as measured by the dextran gel method.

Though the composition of AFCI is not ascertainable, the above physicochemical properties of AFCI suggest that it is a peptide. Aside from the above physiochemical properties, AFCI has the following biological properties.

EXPERIMENT 1

One milliliter of an AFCI solution (diluted with water to the extent that the absorbance of the solution at 260 m$\mu$ is 2.000) was intraperitoneally administered to normal male albino rats (Wister-Imamichi strain), and after 3 hours the rats were sacrificed. Livers were cut off and homogenized with a 10 percent solution of sucrose to obtain an enzyme solution. To 0.2 ml of the resulting enzyme solution was added 0.5 ml of 0.2M potassium phosphate buffer (pH 8), 0.2 ml of tyrosine (in 0.2N sodium hydroxide solution, equivalent to 5 $\mu$ mole), 0.1 ml of 0.4N HCl, 0.1 ml of pyridoxal phosphate (equivalent to 50 $\mu$g) and 0.8 ml of water. The mixture was preincubated at 37°C for 5 minutes and then 0.1 ml of $\alpha$-ketoglutaric acid (equivalent to 10 $\mu$ mole) was added thereto and incubated for 10 minutes.

Figure 5:
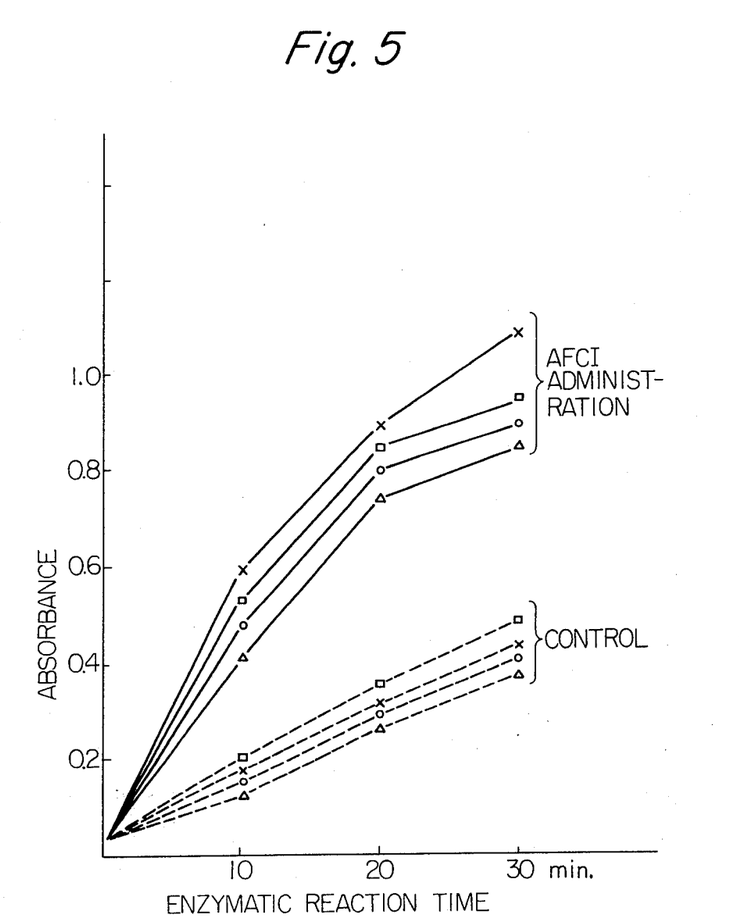
FIGS. 5–7 are graphs showing an enzyme inducing ability of AFCI.

The reaction was stopped by the addition of 0.5 ml of 25% trichloroacetic acid. And then, p-hydroxyphenylpyruvic acid formed was assayed. The results obtained are shown in FIG. 5, as compared with the results by the administration of physiological saline solution as a control. The liver tyrosine transaminase induction activity in FIG. 5 is shown in terms of absorbance at 700 m$\mu$.

EXPERIMENT 2

Figure 6:
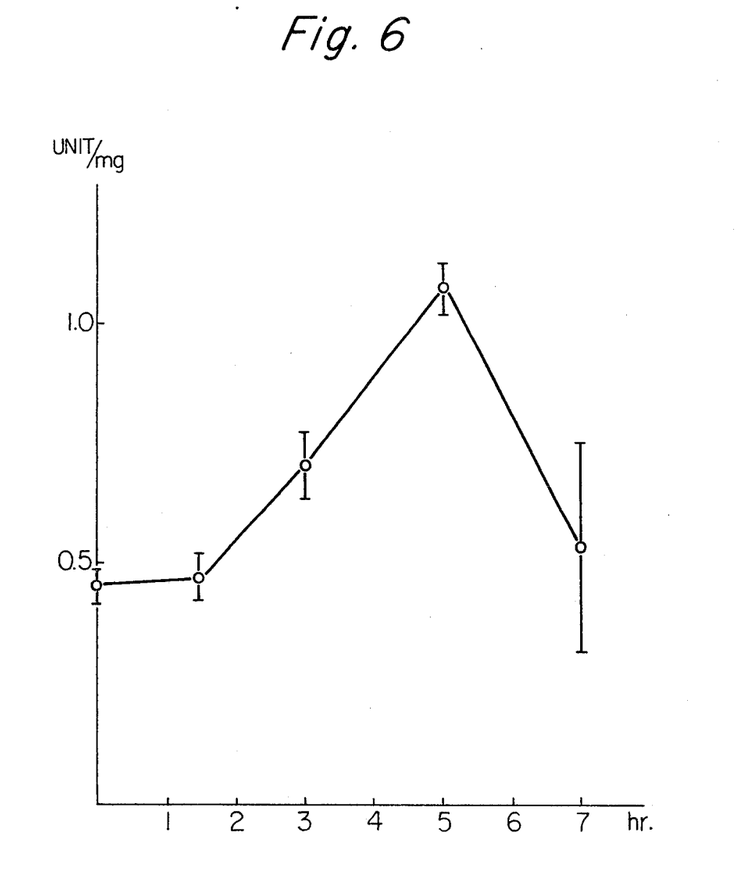

One milliliter of an AFCI solution (diluted with water to the extent that the absorbance of the solution at 260 m$\mu$ is 2.000) was intraperitoneally administered to normal male albino rats weighing 200–250 g (four rats each group, Wister-Imamichi strain). The liver tyrosine transaminase activity was found to be the maximum five hours after administration as shown in FIG. 6.

EXPERIMENT 3

Figure 7:
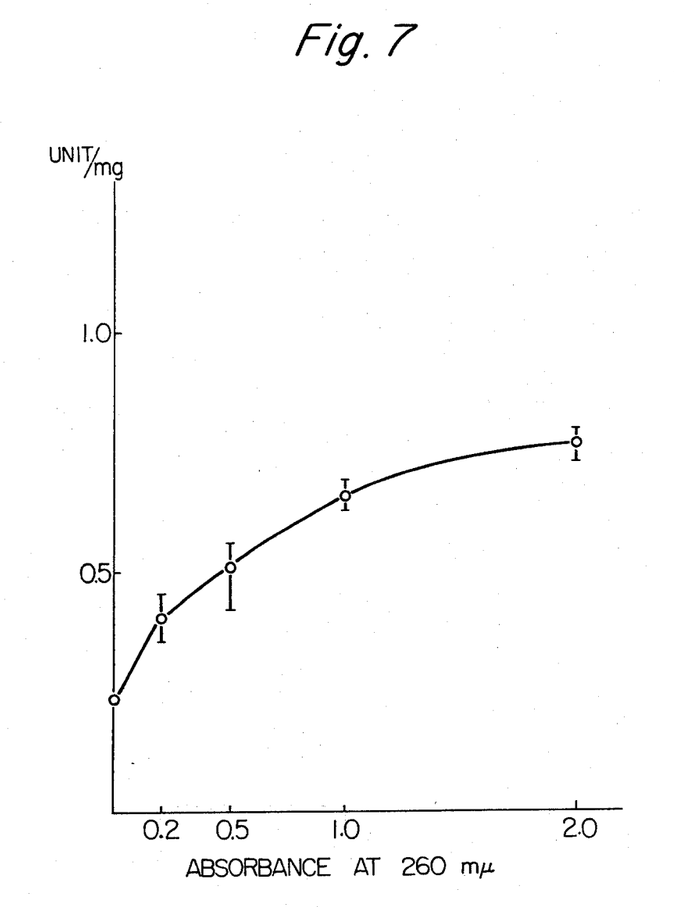

One milliliter of each of AFCI solutions having various concentrations was intraperitoneally administered to normal male albino rats weighing 250–300 g (four rats each group, Wister-Imamichi strain) in order to determine the relationship between the level of dose and the activity of tyrosine transaminase enzyme. The activity was found to be the maximum when 1 ml AFCI solution having a concentration of 2.000 in terms of absorbance at 260 m$\mu$ was administered, as shown in FIG. 7.

EXPERIMENT 4

The tyrosine transaminase induction was not observed in adrenalectomized albino rats when AFCI was administered alone, whereas the tyrosine transaminase was found to be induced strongly by the administration of AFCI in combination with cortisone (Triamcinolone) as shown in Table 1. In this experiment, AFCI was administered in the same level as Experiment 2, and triamcinolone was administered in the level of 1 mg/100 g body weight of albino rat.

Table 1

|  | Number of Albino Rat | Tyrosine Transaminase Activity (unit/mg) |
|---|---|---|
| Physiological Saline Solution | 3 | 0.31 ± 0.02 |
| AFCI | 3 | 0.49 ± 0.06 |
| Triamcinolone | 4 | 5.07 ± 0.85 |
| Triamcinolone + AFCI | 4 | 7.13 ± 0.86 |

When AFCI having the above physiological and biological properties was subjected to column chromatography on Dowex-50 (H form, available from Dow Chemical Company) (2.5 cm diameter × 10 cm length, at a flow rate of 3 ml/10 minutes), it was observed that AFCI consists of at least two components which are slightly different in their physiological properties.

In the present invention, the component which is eluted with 0.01 N HCl is referred to "AFCI-N" and the component which is eluted with 2N $NH_4OH$ is referred to "AFCI-A."

Figure 8:
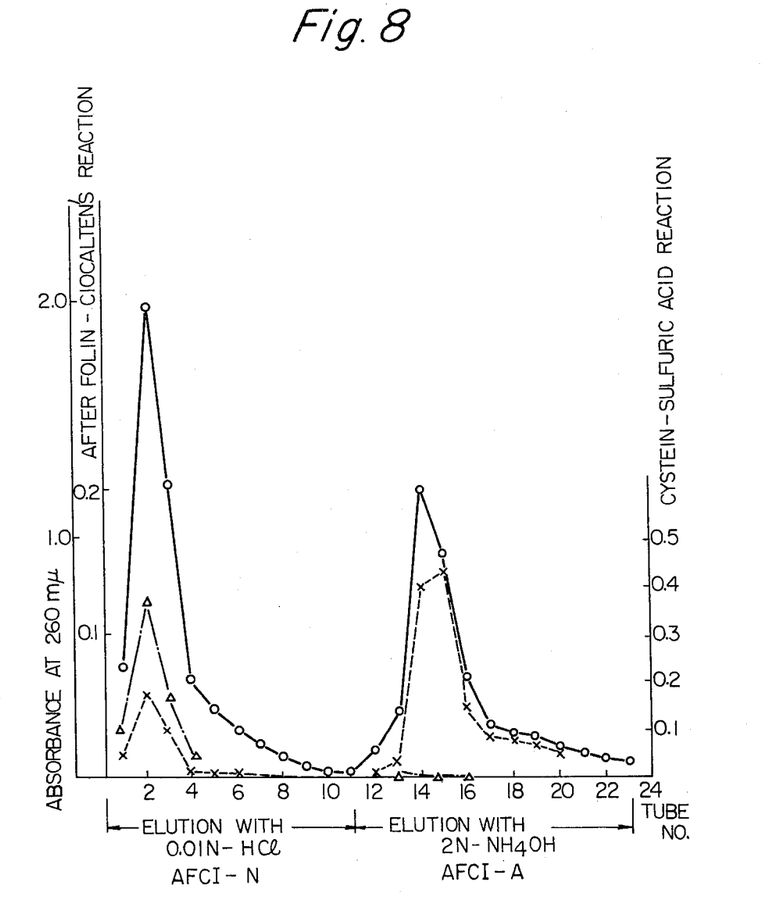
FIG. 8 is an elution pattern of AFCI-N and AFCI-A.

FIG. 8 indicates the elution patterns of both components, and the absorbance of each of the components at 260 m$\mu$ (shown by —o—o— line), the differential absorbance at 415 m$\mu$ and 380 m$\mu$ after cystein-sulfuric acid reaction (shown by —Δ— - —Δ— line), and the absorbance at 750 m$\mu$ after Folin-Ciocalteu's reaction (shown by ····x····x···· line). Various chemical properties of these components are shown in Table 2 below.

Table 2

|  | AFCI-N | AFCI-A |
|---|---|---|
| Ninhydrin | + | ++++ |
| Folin | + | ++++ |
| Orcinol | +++ | + |
| Anthrone | +++ | — |
| Elson-Morgan | — | — |
| $OD_{260}/OD_{280}$ | 1.3 | 3.8 |
| Fluorescence | +++ | ++ |

Both AFCI-N and AFCI-A showed an amplifying activity of liver tyrosine transaminase and branched chain amino acid transaminase inductions in the adrenalectomized albino rat, whereas, in normal albino rat, only AFCI-A exhibited the activity of liver tyrosine transaminase induction, and only AFCI-N exhibited an inhibitory activity of liver serine dehydrogenase induction produced by the administration of glucagon. AFCI-A did not affect the liver serine dehydrogenase induction.

Also, AFCI-N and AFCI-A did not affect the tyrosine transaminase induction by the administration of glucagon or insulin.

Figure 3:
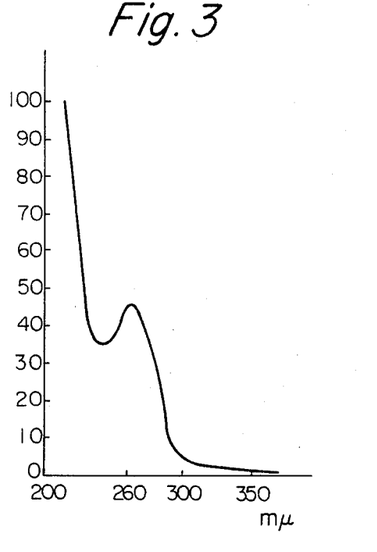
FIG. 3 is ultraviolet absorption spectrum in water of purified AFCI-A.
Figure 4:
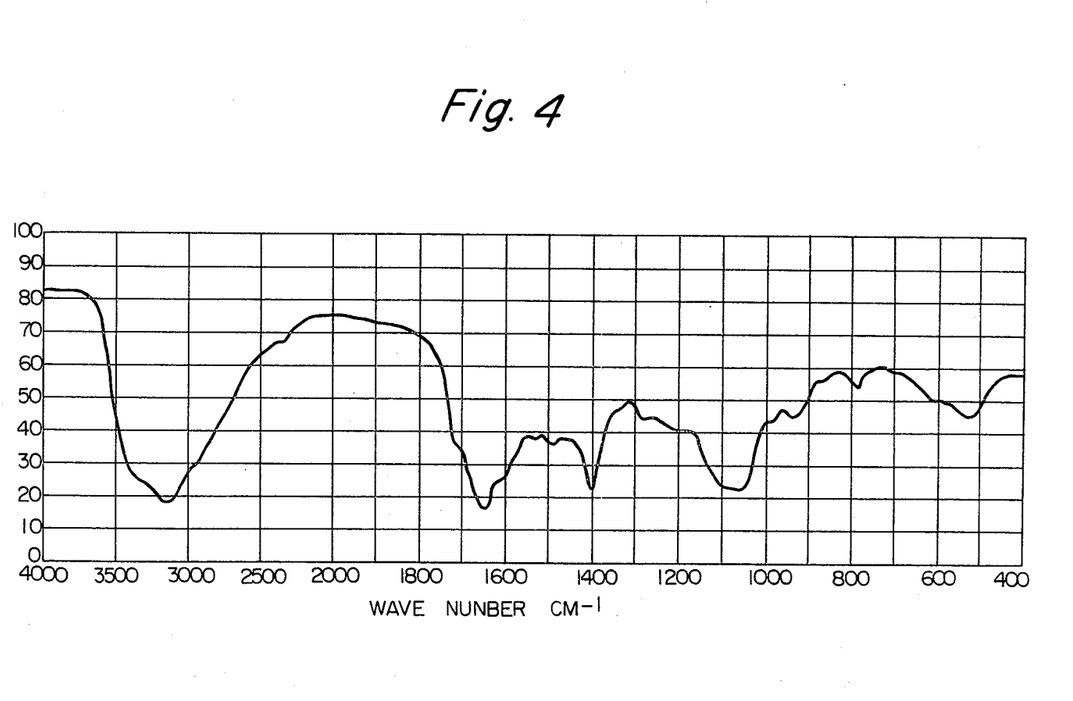
FIG. 4 is infrared absorption spectrum of purified AFCI-A by KBr disc method.
Figure 10:
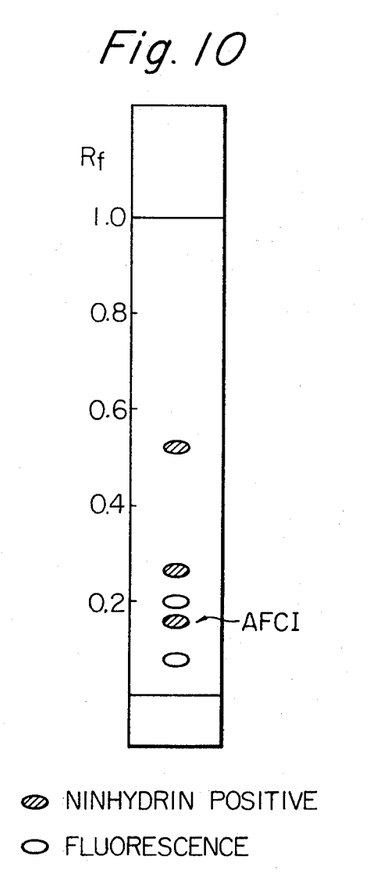
FIG. 10 is paper chromatogram of AFCI-A.

These results are shown in Table 3. In this experiment, AFCI-N and AFCI-A were administered in an amount of 1 ml having a concentration of 2.000 in terms of the absorbancy at 260 m$\mu$, and glucagon and insulin were administered at the dose of 100 $\mu$g and one unit, respectively, per 100 g of the body weight of albino rat. The albino rats (Wister-Imamichi strain, male, four rats each group) were sacrificed five hours after the administration and subjected to the determination of the enzyme induction ability.

cence with the radiation of Manaslu-light 3000 A. Rf values of each spots are shown in FIG. 10. The physiologically active component of AFCI-A (i.e. purified AFCI-A) equivalent to the ninhydrin positive spot having Rf value of 0.19–0.20, and the molecular weight of the component presumed to lie somewhere between the molecular weight of vitamin $B_{12}$ (1357) and that of trypsin inhibitor (6000) as determined by the dextran gel method (Sephadex G-25 available from Pharmacia Co.; 1.8 cm × 65 cm column at a flow rate of 10 drops/min., eluted with water). Elementary analysis is C, 30.32%, H, 5.23%, N, 12.77%, with the exception of sulfur and oxygen. Chemical properties and the results of the amino acid analysis of the purified AFCI-A are shown in Table 4. Also, it shows ultraviolet and infrared absorption spectrum as shown in FIG. 3 and FIG. 4, respectively, where it exhibits characteristic absorption in the ultraviolet region at 263 m$\mu$ in water and in the infrared region at 3,180, 1,650, 1,400, 1,050, 785 and 520 cm$^{-1}$ by KBr disc method.

Table 4

| Chemical Properties | | Amino Acid Analysis (Stein-Moore Method; Number of amino acid/molecule) | |
|---|---|---|---|
| Ninhydrin* | ++ | Aspartic Acid | 3 |
| Elson-Morgan | — | Glutamic Acid + Glutamin | 12–13 |
| Orcinol | — | Glycine | 7 |
| Anthrone | — | Alanine | 2 |
| Organic Phosphorus | — | Cystein | 3 |
| Fluorescence | — | Methionine | 4 |

*Ninhydrin reagent is prepared by dissolving 50 mg of ninhydrin in a mixture of 30 ml of ethanol, 10 ml of acetic acid and 4 ml of collidine, and the color reaction is determined after five minutes at 80°C.

Hypotensive activity of purified AFCI-A is shown in

Table 3

| | Agents Administered | Tyrosine Transaminase Activity | Serine Dehydrogenase Activity | Transaminase Activity on Branched Chain Amino Acid |
|---|---|---|---|---|
| Normal Albino Rat | Physiological Saline Solution (control) | 0.21 ± 0.04 | 0.47 ± 0.13 | — |
| | AFCI-N | 0.20 ± 0.02 | — | — |
| | AFCI-A | 0.99 ± 0.11 | — | — |
| | AFCI-N + AFCI-A | 0.99 ± 0.14 | — | — |
| | Glucagon | 0.48 ± 0.04 | 0.72 ± 0.03 | — |
| | Glucagon + AFCI-N | 0.56 ± 0.09 | 0.33 ± 0.04 | — |
| | Glucagon + AFCI-A | 0.45 ± 0.07 | 1.02 ± 0.04 | — |
| | Insulin | 0.71 ± 0.08 | — | — |
| | Insulin + AFCI-N | 0.67 ± 0.06 | — | — |
| | Insulin + AFCI-A | 0.55 ± 0.11 | — | — |
| Adrenalectomized Albino Rat | Physiological Saline Solution (control) | 0.27 ± 0.05 | — | — |
| | AFCI-N | 0.23 ± 0.01 | — | — |
| | AFCI-A | 0.21 ± 0.01 | — | — |
| | Triamcinolone | 2.54 ± 0.17 | — | 12.0 ± 0.19 |
| | Triamcinolone + AFCI-N | 4.06 ± 0.31 | — | 21.5 ± 2.6 |
| | Triamcinolone + AFCI-A | 4.03 ± 0.30 | — | 28.8 ± 0.3 |
| | Triamcinolone + AFCI-N + AFCI-A | 3.94 ± 0.28 | — | — |

Figure 9A:
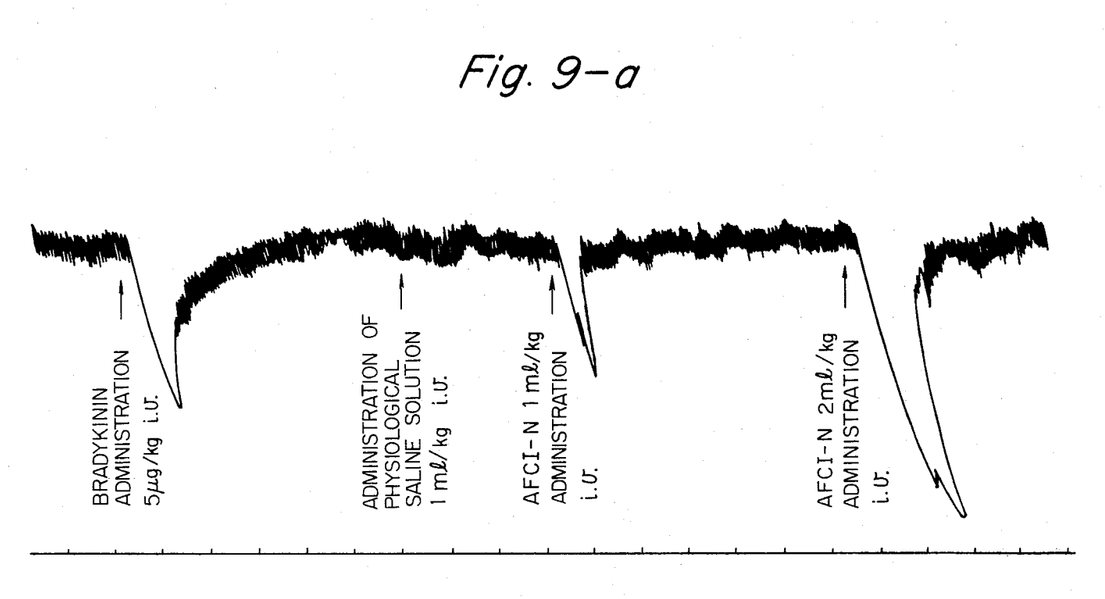
Figure 9B:
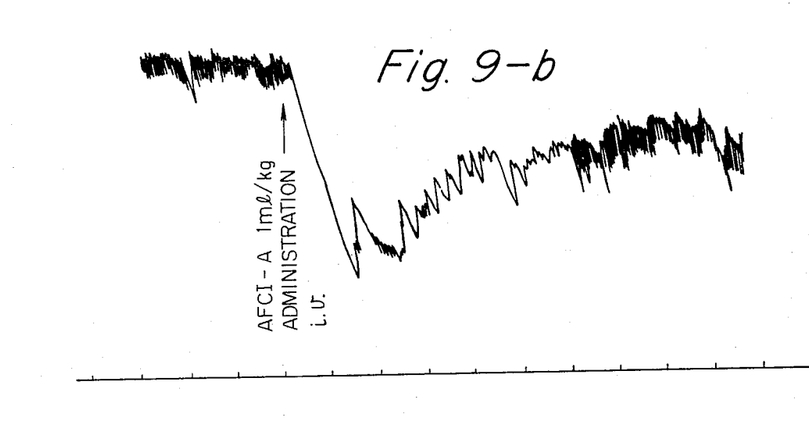

AFCI-N and AFCI-A also exhibit hypotensive activity when administered parenterally but their modes of action are clearly different. AFCI-N exhibits a transient hypotensive activity similar to that of bradykinin, whereas AFCI-A exhibits a transient hypotensive activity followed by a continuous hypotensive activity. These hypotensive activities are shown in FIG. 9-a and FIG. 9-b.

In the paper chromatography according to the ascending method using a solvent system of n-butanol: acetic acid:water (4:1:5 by volume) as a developing agent, AFCI-A exhibits three spots which develop a color with ninhydrin and two spots which show fluores-

Figure 9C:
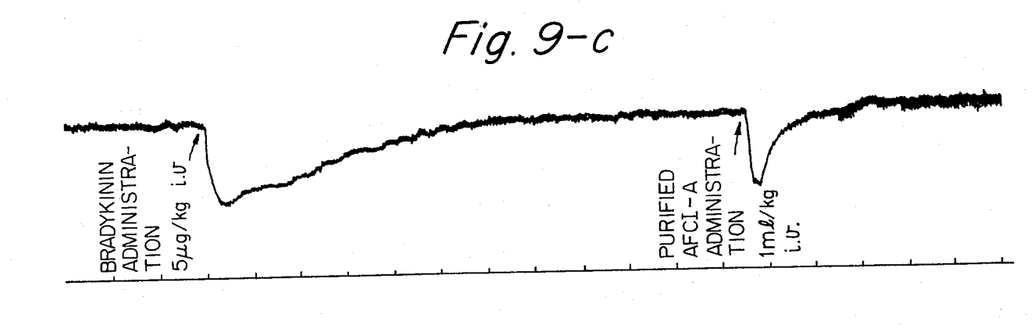

FIG. 9-c.

EXAMPLE 1

One piece of feces was taken from the anus of male albino rat (Wister-Imamichi strain) and homogenized in 20 ml of a physiological saline solution. The resulting homogenate was then shake-cultured in Trypto Soya agar medium (available from Nissui Seiyaku Co., Ltd., Japan) at 37°C for 12 hours and the thus obtained inoculum was then used to inoculate an agar slant. A loopful of the resulting colony which was identified as Proteus mirabilis Havser (N-3), ATCC 21721, by the procedures described in "Laboratory Methods in Microbiology" and "Bergey's Manual of Determinative Bacteriology" was used to inoculate a total of 3000 ml of a medium, contained in fifteen sterilized Sakaguchi's flasks in equal portions, consisting of 1.5% trypticase (available from Baltimore Biological Laboratory), 0.5% yeast extract, 0.5% sodium chloride, 0.25% glucose, 0.25% dipotassium hydrogenphosphate, the medium being adjusted to pH 7.3 with sodium hydroxide and being sterilized under 1 kg/cm$^2$ for 10 minutes, and the media were shake-cultured for 24 hours at a temperature of 27°C. The resulting seed culture was then used to inoculate 60 l of a sterilized medium having the same composition as above contained in a 100 l fermentor. At the same time, a small amount of soybean oil was added to the medium as a defoaming agent.

The cultivation was then carried out at a temperature of 27°C and at an inner pressure of in a range of from 0.5 to 0.8 kg/cm$^2$ for 18 hours while aerating at a rate of 30 l/minute and stirring at 200 r.p.m. The turbidity of the culture broth at the end of this cultivation period was 0.825 as measured for the absorbance of a five-fold dilution thereof at a wave length of 660 m$\mu$ (light pass: 1 cm).

After completion of the cultivation, the culture broth was continuously centrifuged at 10,000 r.p.m. to collect microbial cells, and the cells were suspended in 10 l of physiological saline solution. The suspension was again centrifuged at 10,000 r.p.m. for 20 minutes to collect the washed cells. The cells were then suspended in physiological saline solution to a total of 5 l and the suspension was sonicated at 20 kilocycles in 50 ml portions. The sonicate was then centrifuged at 10,000 r.p.m. for 10 minutes and 10% perchloric acid was added to the supernatant to a 2% concentration. The mixture was cooled and deproteinized by centrifugation. The deproteinized solution was then adjusted to pH 5 to 5.5 by addition of 5N aqueous potassium hydroxide and centrifuged to remove potassium perchloride. Activated carbon was added to the supernatant in a proportion of 1 g per 200 ml of the supernatant followed by stirring for 30 minutes to adsorb AFCI on the activated carbon. The mixture was centrifuged at a rate of 3000 r.p.m. for 10 minutes to collect the activated carbon which was then washed with water and extracted twice with 400 ml of a 50:50 mixture (by volume) of 0.2N potassium hydroxideacetone. The extract was concentrated under reduced pressure to remove acetone, made neutral with 2% perchloric acid and concentrated under reduced pressure to 100 ml. The concentrate was filtered to give a yellow transparent filtrate.

The resulting filtrate was then subjected to column chromatography on Sephadex G-10 (a column of 5 cm diameter × 70 cm length, at a flow rate of 20 ml/hour), and 20 ml fractions were collected by using distilled water as a solvent for elution. Sephadex G-10 in a dextran gel with a water regain value of about 1 ml/g dry material and having a molecular weight fractionation of less than 700.

Each fraction eluting from the dextran gel column was intraperitoneally administered to normal male albino rats (Wister-Imamichi strain) and the animals were sacrificed after an elapse of 5 hours. The liver tyrosine transaminase activity was measured according to the procedures of Experiment I as described below. The active fractions having the inducing activity of tyrosine transaminase (fraction No. 26-34) were pooled. The combined fractions 26-34 which contain AFCI were concentrated under reduced pressure and lyophilized to give 800 mg of AFCI as a highly hygroscopic powder.

EXAMPLE 2

500 ml of a medium consisting of 1.5% peptone, 0.5% yeast extract, 0.5% sodium chloride, 0.25% glucose and 0.25% dipotassium hydrogenphosphate (pH 7.3) was inoculated with each of the various organisms disclosed herein and shake-cultured for 20 hours at a temperature of 27°C. The culture broth in each case was then worked up in the same manner as described in Example 1 to obtain the results shown in Table 5.

Table 5

| Organism | Yield* | Induction Rate for Deriving Tyrosine Transaminase** |
|---|---|---|
| Escherichia coli IAM 1016 | 10(14.1) | 1.93 |
| Escherichia coli IAM 1253 | 10(18.1) | 1.74 |
| Erwinia aroideae IAM 1068 | 15(1.46) | 2.4 |
| Erwinia carotovora IAM 1024 | 10(0.86) | 2.0 |
| Serratia marcescens FERM-P No. 297,ATCC 21717 | 15(2.14) | 1.98 |
| Proteus mirabilis OM-1,ATCC 21718 | 15(5.40) | 3.0 |
| Proteus vulgalis YO-1,ATCC 21719 | 20(4.26) | 2.32 |
| Proteus morganii AA-2,ATCC 21720 | 15(4.90) | 3.45 |
| Aerobacter aerogenes IAM 1183 | 15(1.84) | 1.9 |

*AFCI liquid quantity (determined by absorbance at 260 m$\mu$)
**an average of three cases. The induction rate produced by the administration of an aqueous physiological saline solution is referred to "1".

What we claim is:
1. A process for the production of an amplifying factor of cortisone induction comprising the steps of:
   cultivating a microorganism selected from the group consisting of Escherichia coli IAM 1016, Escherichia coli IAM 1253, Erwinia aroideae IAM 1068, Edwinia carotovora IAM 1024, Serrati marcesens ATC 21717, Proteus mirabilis ATCC 21718, Proteus vulgaris ATCC 21719, Proteus morganii ATCC 21720, and Aerobacter aerogenes IAM 1183 under normal growth conditions in an aqueous nutrient medium containing assimilatable sources of carbon, nitrogen and inorganic salts until a sufficient amount of an amplifying factor of cortison induction is obtained;
   extracting the cells from said broth with water or physiological saline solution to obtain an aqueous bacterial extract;
   deproteinizing said extract;
   absorbing said deproteinized extract on activated carbon at a pH of 3-7;
   eluting the adsorbate with 50:50 alkali-acetone mixture to obtain an eluate;
   neutralizing and concentrating the eluate;
   subjecting the concentrate to column chromatography on dextran gel having a fractionation range of less than 700; and
   collecting the fractions containing an amplifying factor of cortison induction.
2. A process according to claim 1, wherein said deproteinizing step is carried out with the addition of an acid selected from the group consisting of perchloric acid and trichloroacetic acid.

3. A process according to claim 1, wherein said alkali-acetone mixture is an equal volume mixture of 0.2N aqueous potassium hydroxide and acetone.

4. A process in accordance with claim 1 further including the step of filtering the culture broth to obtain microbial cells and a filtrate prior to said extracting step and further including the step of combining the aqueous bacterial extract and the filtrate after said extracting step and prior to said deproteinizing step wherein the combined extract and the filtrate are deproteinized in said deproteinizing step.

5. A process according to claim 4, wherein said alkali-acetone mixture is an equal volume mixture of 0.2N aqueous potassium hydroxide and acetone.

6. A process in accordance with claim 1 further including the step of centrifuging the culture broth to obtain microbial precipitates and a supernatant prior to said extracting step and further including the step of combining the aqueous bacterial extract and the supernatant after said extracting step wherein the combined extract and the supernatant are deproteinized in said deproteinizing step.

7. A process according to claim 6, wherein said alkali-acetone mixture is an equal volume mixture of 0.2N aqueous potassium hydroxide and acetone.

8. An amplifying factor of cortisone induction produced by the process of claim 1.

* * * * *